United States Patent
Sikora et al.

(10) Patent No.: US 12,056,193 B2
(45) Date of Patent: *Aug. 6, 2024

(54) OCCUPANT COMFORT MODEL EXTRAPOLATION

(71) Applicant: Honeywell International Inc., Charlotte, NC (US)

(72) Inventors: Marek Sikora, Kurim (CZ); Petr Endel, Prague (CZ)

(73) Assignee: Honeywell International Inc., Charlotte, NC (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/820,748

(22) Filed: Aug. 18, 2022

(65) Prior Publication Data
US 2022/0398281 A1   Dec. 15, 2022

Related U.S. Application Data

(63) Continuation of application No. 16/594,283, filed on Oct. 7, 2019, now Pat. No. 11,455,341.

(51) Int. Cl.
*G06F 16/9035* (2019.01)
*G06F 16/903* (2019.01)
(Continued)

(52) U.S. Cl.
CPC .... *G06F 16/9035* (2019.01); *G06F 16/90335* (2019.01); *G06N 5/022* (2013.01); *H04L 67/12* (2013.01); *H04L 67/306* (2013.01)

(58) Field of Classification Search
CPC .......... G06F 16/9035; G06F 16/90335; G06N 5/022; H04L 67/12; H04L 67/306
(Continued)

(56) References Cited

U.S. PATENT DOCUMENTS 10,969,133 B2 *  4/2021  Harvey ............. G05B 13/0265
11,215,375 B2 *  1/2022  Alanqar .................. F24F 11/62
(Continued)

FOREIGN PATENT DOCUMENTS

WO    WO 2017/044495 A1 *  3/2017  ............ B60W 50/00

OTHER PUBLICATIONS

Kim, Joyce, et al., "Personal comfort models: Predicting individuals' thermal preference using occupant heating and cooling behavior and machine learning", Building and Environment, vol. 129, Feb. 1, 2018, ScienceDirect, pp. 96-106.*
(Continued)

*Primary Examiner* — Robert Stevens
(74) *Attorney, Agent, or Firm* — Alston & Bird LLP

(57) ABSTRACT

Method, apparatus and computer program product for comfort model extrapolation. For example, the apparatus includes at least one processor and at least one non-transitory memory including program code. The at least one non-transitory memory and the program code are configured to, with the at least one processor, obtain a plurality of known comfort models including: one or more cross-space comfort models each associated with a primary occupant profile and a known spatial element of one or more known spatial elements, one or more cross-profile comfort models each associated with a secondary occupant profile and an unknown spatial element, and one or more cross-context comfort models each associated with a secondary occupant profile and a known spatial element; and generate a unknown comfort model for the primary occupant profile and the unknown spatial element based on the plurality of known comfort models.

20 Claims, 9 Drawing Sheets

(51) Int. Cl.
*G06N 5/022* (2023.01)
*H04L 67/12* (2022.01)
*H04L 67/306* (2022.01)

(58) Field of Classification Search
USPC .......................................................... 707/722
See application file for complete search history.

(56) References Cited

U.S. PATENT DOCUMENTS

| | | | |
|---|---|---|---|
| 2010/0262298 A1 | 10/2010 | Johnson et al. | |
| 2013/0245837 A1* | 9/2013 | Grohman | G05B 19/0428 700/276 |
| 2014/0277760 A1 | 9/2014 | Marik et al. | |
| 2014/0277765 A1* | 9/2014 | Karimi | G05B 15/02 700/276 |
| 2015/0330645 A1* | 11/2015 | Speranzon | F24F 11/62 706/46 |
| 2016/0223215 A1* | 8/2016 | Buda | G05D 23/1917 |
| 2017/0123440 A1 | 5/2017 | Mangsuli et al. | |
| 2018/0134116 A1 | 5/2018 | Chen et al. | |
| 2018/0202677 A1 | 7/2018 | Endel et al. | |
| 2018/0202678 A1 | 7/2018 | Ahuja et al. | |
| 2018/0204162 A1 | 7/2018 | Endel et al. | |
| 2018/0208209 A1 | 7/2018 | Al-Dahle et al. | |
| 2018/0245809 A1 | 8/2018 | Endel et al. | |
| 2018/0347845 A1* | 12/2018 | Harvey | F24F 11/63 |
| 2019/0103182 A1* | 4/2019 | Borshch | G06F 16/24575 |
| 2019/0280890 A1* | 9/2019 | Muta | G06N 20/00 |
| 2020/0200416 A1* | 6/2020 | Granger | G16H 40/67 |

OTHER PUBLICATIONS

Lam, Abraham Hang-yat, et al., "An Occupant-participatory Approach for Therman Comfort Enhancement and Energy Conservation in Buildings", e-Energy '14, Cambridge, UK, Jun. 11-13, 2014, pp. 133-143.*

Kim, Joyce, et al., "Personal comfort models—A new paradigm in thermal comfort for occupant-centric environmental control", Building and Environment, vol. 132, Mar. 15, 2018, ScienceDirect, pp. 114-124.*

Peng, Yuzhen, et al., "Temperature-preference learning with neural networks for occupant-centric building indoor climate controls", Building and Environment, vol. 154, May 2019, pp. 296-308.*

Li, Da, et al., "Personalized human comfort in indoor building environments under diverse conditioning modes", Building and Environment, vol. 126, Elsevier, Dec. 2017, pp. 304-317.*

Saelens, Dirk, et al., "Energy and comfort performance of thermally activated building systems including occupant behavior", Building and Environment, vol. 46, Issue 4, Elsevier, Apr. 2011, pp. 835-848.*

Aryal, Ashrant, et al., "Energy consequences of Comfort-driven temperature setpoints in office buildings", Energy & Buildings, vol. 177, Oct. 15, 2018, pp. 33-46.

Croitoru, Cristiana, et al., "Thermal comfort models for indoor spaces and vehicles—Current capabilities and future perspectives", Renewable and Sustainable Energy Reviews, vol. 44, Apr. 2015, pp. 304-318.

Lam, Abraham Hang-yat, et al., "An Occupant-participatory Approach for Thermal Comfort Enhancement and Energy Conservation in Buildings", e-Energy '14, Cambridge, UK, Jun. 13-14, 2014, pp. 133-143.

Ioannidis, Dimosthenis, et al., "Occupancy driven building performance assessment", Journal of Innovation in Digital Ecosystems, vol. 3, Issue 2, Dec. 2016, pp. 57-69.

Non-Final Office Action received for U.S. Appl. No. 16/594,283, mailed on Sep. 28, 2021, 11 pages.

Notice of Allowance received for U.S. Appl. No. 16/594,283, mailed on May 18, 2022, 10 pages.

* cited by examiner

OCCUPANT COMFORT MODEL EXTRAPOLATION

CROSS-REFERENCE TO RELATED APPLICATIONS

This application is a continuation of U.S. patent application Ser. No. 16/594,283, filed Oct. 7, 2019, which is incorporated herein by reference in its entirety.

BACKGROUND

Applicant has identified many deficiencies and problems associated with existing methods, apparatus, and systems related to managing occupant comfort in buildings. For example, many existing solutions fail to enable effective and efficient initialization of comfort models, which in turn undermines adaptability of existing comfort management systems. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present disclosure provide methods, apparatus, systems, devices, and/or the like for comfort model extrapolation by using at least one of cross-model extrapolations, cross-profile extrapolations, and cross-space extrapolations. In accordance with one aspect, an apparatus is provided. The apparatus comprises at least one processor and at least one non-transitory memory comprising program code. The at least one non-transitory memory and the program code are configured to, with the at least one processor, cause the apparatus to perform a method for generating an unknown comfort model for a primary occupant profile with respect to an unknown spatial element, the method comprising: obtaining a plurality of known comfort models, wherein the plurality of known comfort models comprise: (i) one or more cross-space comfort models each associated with the primary occupant profile and a known spatial element of one or more known spatial elements, (ii) one or more cross-profile comfort models each associated with a secondary occupant profile of one or more secondary occupant profiles and the unknown spatial element, and (iii) one or more cross-context comfort models each associated with a secondary occupant profile of the one or more secondary occupant profiles and a known spatial element of the one or more known spatial elements; and generating the unknown comfort model based on the plurality of known comfort models.

In some embodiments, generating the unknown comfort model comprises performing a cross-profile extrapolation based on the plurality of known comfort models. In some of those embodiments, performing the cross-profile extrapolation comprises: generating, based on the one or more cross-space comfort models, a first comfort preference aggregation for the primary occupant profile with respect to the one or more known spatial elements; generating, for each secondary occupant profile of the one or more secondary occupant profiles, a second comfort preference aggregation associated with the one or more known spatial elements based on the cross-context comfort model for the secondary occupant profile; generating, for each secondary occupant profile of the one or more secondary occupant profiles, a preference distance measure between the first comfort preference aggregation for the primary occupant profile and the second comfort preference aggregation for the secondary occupant profile; identifying, based on each preference distance measure for a secondary occupant profile of the one or more secondary occupant profiles, one or more proximate occupant profiles of the one or more secondary occupant profiles; generating, for each proximate occupant profile of the one or more proximate occupant profiles, a third comfort preference aggregation associated with the unknown spatial element based on the cross-context comfort model for the proximate occupant profile; and generating the unknown comfort model based on each third comfort preference aggregation for a proximate occupant profile of the one or more proximate occupant profiles and each preference distance measure for a proximate occupant profile of the one or more proximate occupant profiles. In some embodiments, generating the unknown comfort model based on each third comfort preference aggregation model and each preference distance measure comprises: generating an initial comfort preference aggregation for the primary occupant profile based on each third comfort preference aggregation; generating an initial preference offset for the initial comfort preference aggregation based on each preference distance measure; and generating the unknown comfort model based on the initial comfort preference aggregation and the initial preference offset.

In some embodiments, generating the unknown comfort model comprises performing a cross-space extrapolation based on the plurality of known comfort models. In some of those embodiments, performing the cross-space extrapolation comprises identifying a plurality of target occupant profiles for the known spatial element, wherein the plurality of target occupant profiles comprise the primary occupant profile and one or more shared occupant profiles, and wherein each shared occupant profile of the one or more shared occupant profiles for the known spatial element is associated with a first defined comfort model with respect to each known spatial element of the one or more known spatial elements and a second defined comfort model with respect to the unknown spatial element; generating an unknown per-space comfort preference aggregation for each per-space occupant profile of the plurality of per-space occupant profiles with respect to the known spatial element; for each known spatial element of the one or more known spatial elements: generating a known per-space comfort preference aggregation for each shared occupant profile of the one or more shared occupant profiles with respect to the known spatial element, and generating a per-space comfort prediction for the known spatial element based on: (i) a first range of each known per-space comfort preference aggregation for a shared occupant profile of the one or more shared occupant profiles with respect to the known spatial element, (ii) a second range of each unknown per-space comfort preference aggregation for a target occupant profile of the plurality of target occupant profiles, and (iii) a primary known per-space comfort preference aggregation for the primary occupant profile with respect to the known spatial element; and generating the unknown comfort model based on each per-space comfort prediction for a known spatial element of the one or more known spatial elements. In some embodiments, the per-space distribution indicator for a particular known spatial element of the one or more known spatial elements is determined further based on a per-space distance between the known per-space comfort preference aggregation for the primary occupant profile and an extremum known per-source comfort preference aggregation associated with the particular known spatial element.

In some embodiments, generating the unknown comfort model comprises: for each known spatial element of the one or more spatial elements, identifying a plurality of per-space occupant profiles, wherein the plurality of per-space occupant profiles for the known spatial element comprise the primary occupant profile and one or more shared occupant profiles for the known spatial element, and wherein each shared occupant profile of the one or more shared occupant profiles for the known spatial element is associated with a first defined comfort model with respect to the known spatial element and a second defined comfort model with respect to the unknown spatial element; determining whether the one or more known spatial elements comprise a first threshold number of spatial elements each having a second threshold number of shared occupant profiles; in response to determining that the one or more known spatial elements comprise the first threshold number of spatial elements, generating the unknown comfort model by performing a cross-space extrapolation based on the plurality of known comfort models; and in response to determining that the one or more known spatial elements fail to comprise the first threshold number of spatial elements, generating the unknown comfort model by performing a cross-profile extrapolation based on the plurality of known comfort models. In some embodiments, the method further comprises obtaining a location assignment request for an event associated with the primary occupant profile; and processing the location assignment request based on the unknown comfort model to generate a location assignment for the event.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
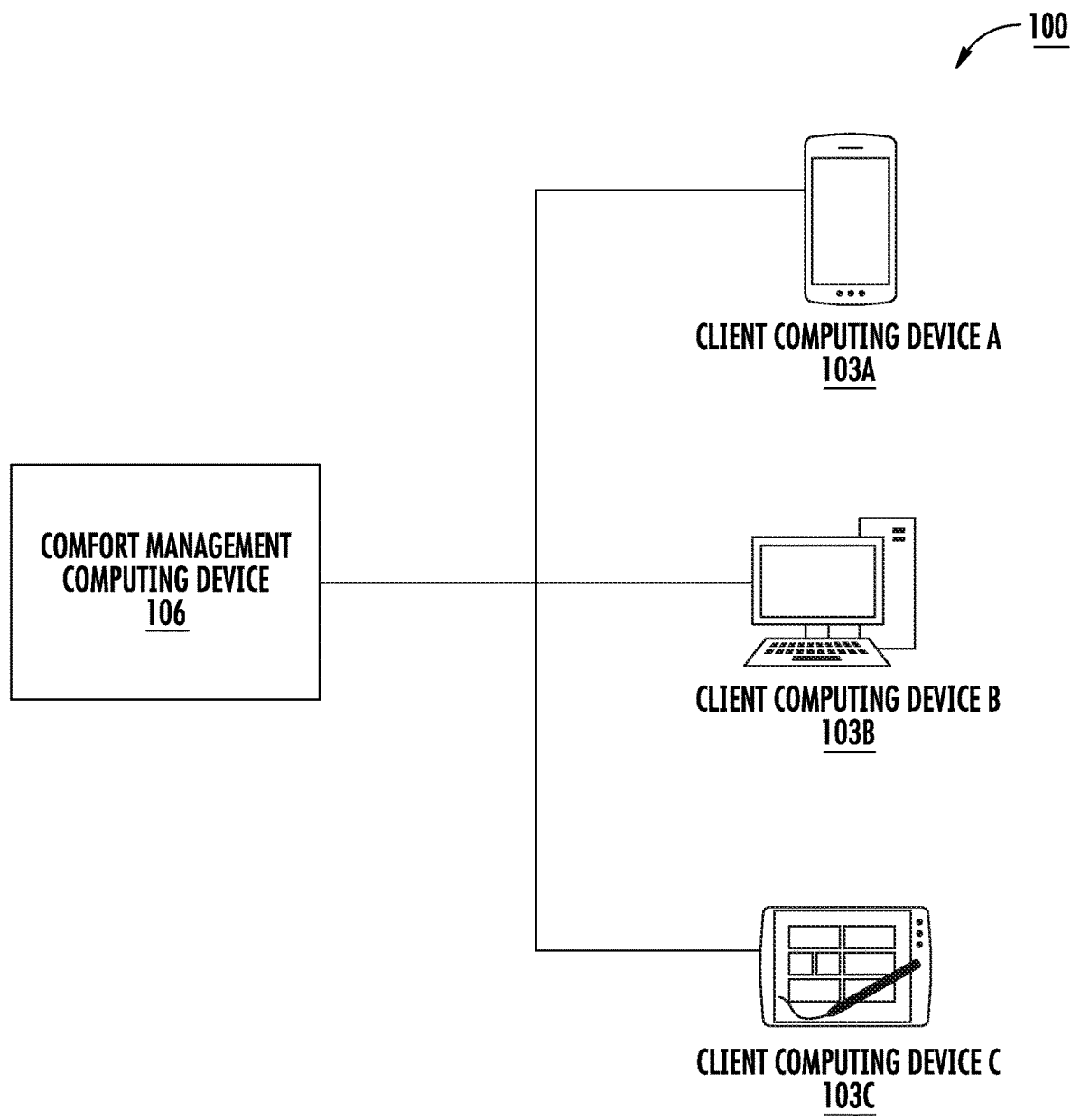

Having thus described some embodiments in general terms, references will now be made to the accompanying drawings, which are not necessarily drawn to scale, and wherein:

FIG. 1 is an example system architecture within which embodiments of the present disclosure may operate.

Figure 2:
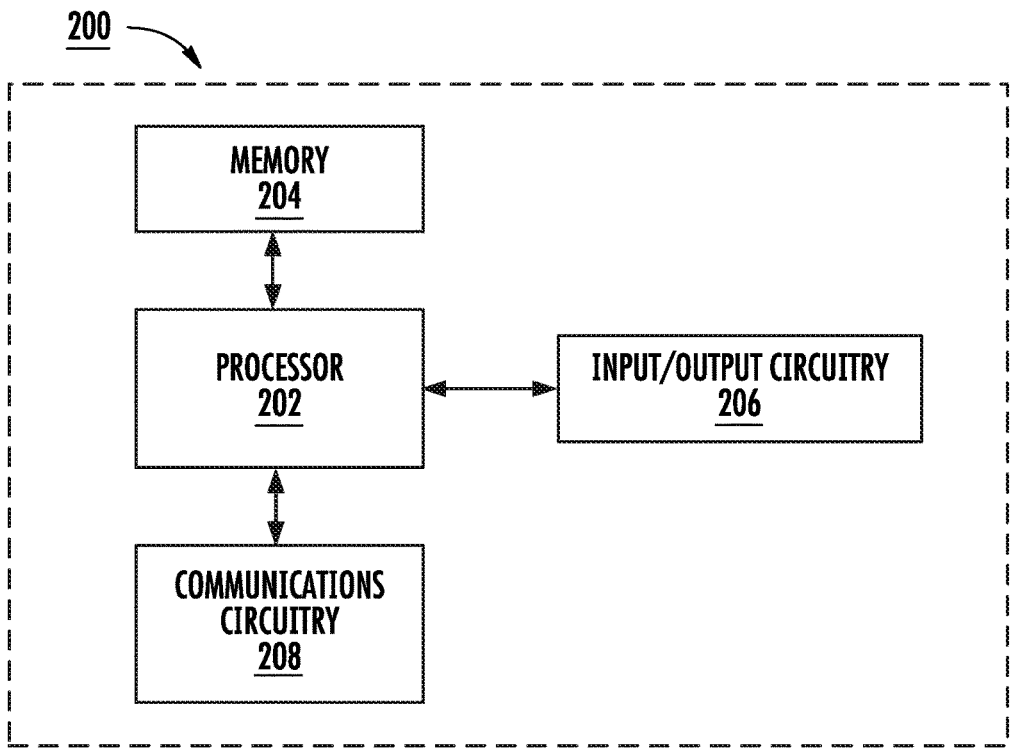

FIG. 2 is a schematic diagram of an example apparatus for a comfort management computing device in accordance with one embodiment of the present disclosure.

Figure 3:
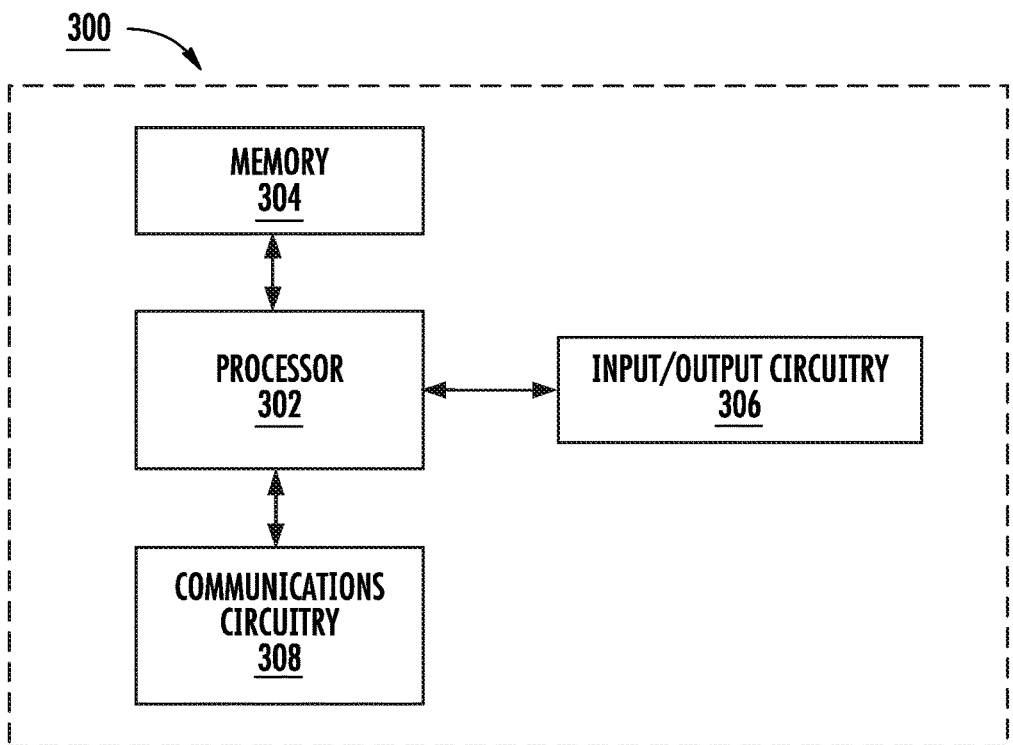

FIG. 3 is a schematic diagram of an example apparatus for a client computing device in accordance with one embodiment of the present disclosure.

Figure 4:
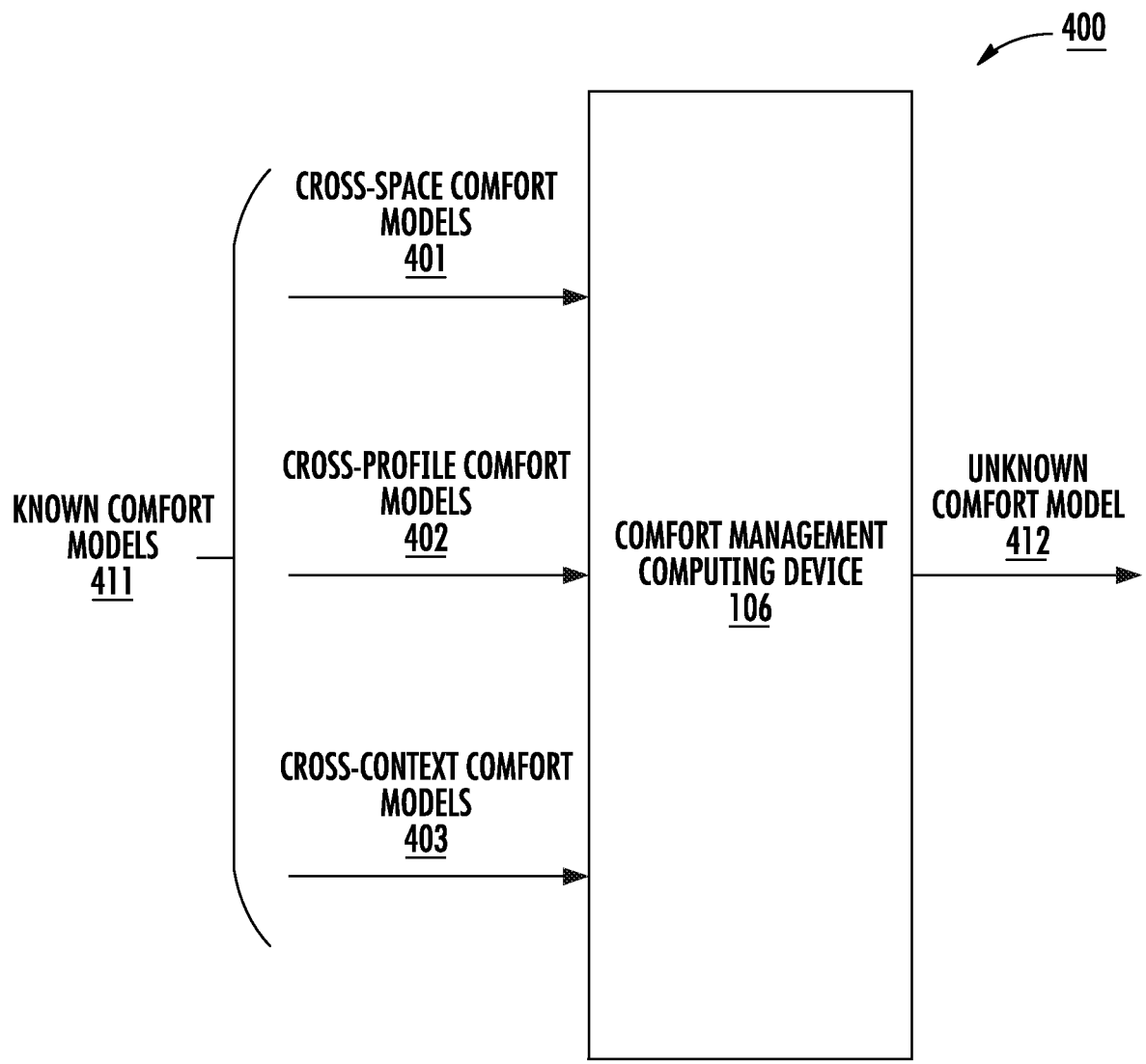

FIG. 4 is a dataflow diagram of an example process for generating an unknown comfort model using cross-model extrapolations in accordance with one embodiment of the present disclosure.

Figure 5:
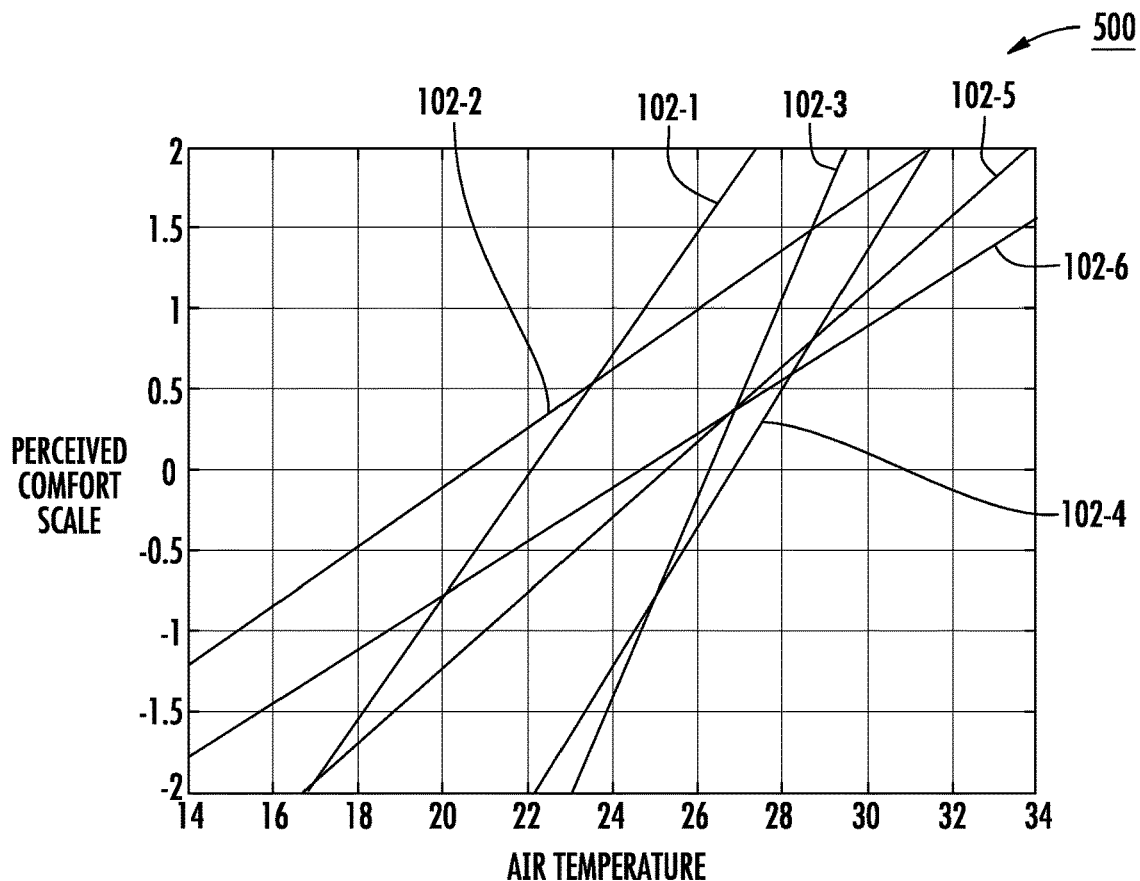

FIG. 5 provides an operational example of a comfort model graphical representation in accordance with one embodiment of the present disclosure.

Figure 6:
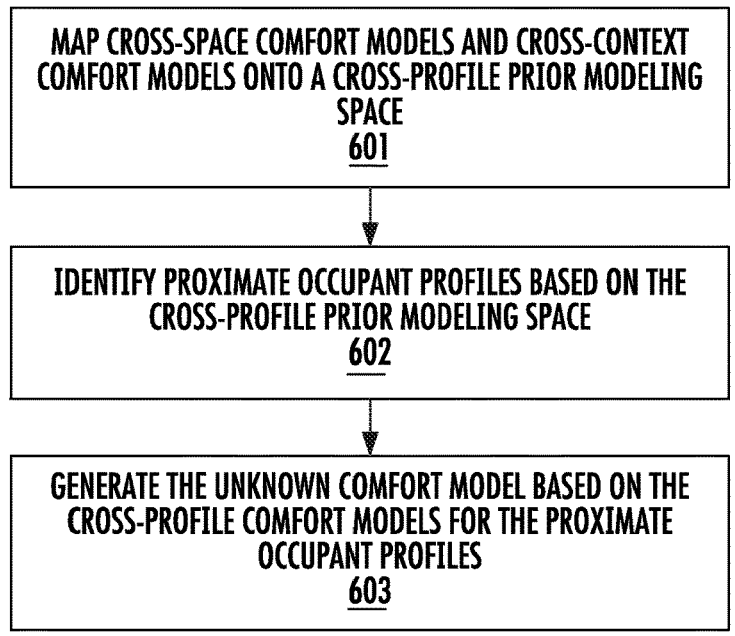

FIG. 6 is a flowchart diagram of an example process for generating an unknown comfort model using cross-profile extrapolations in accordance with one embodiment of the present disclosure.

Figure 7:
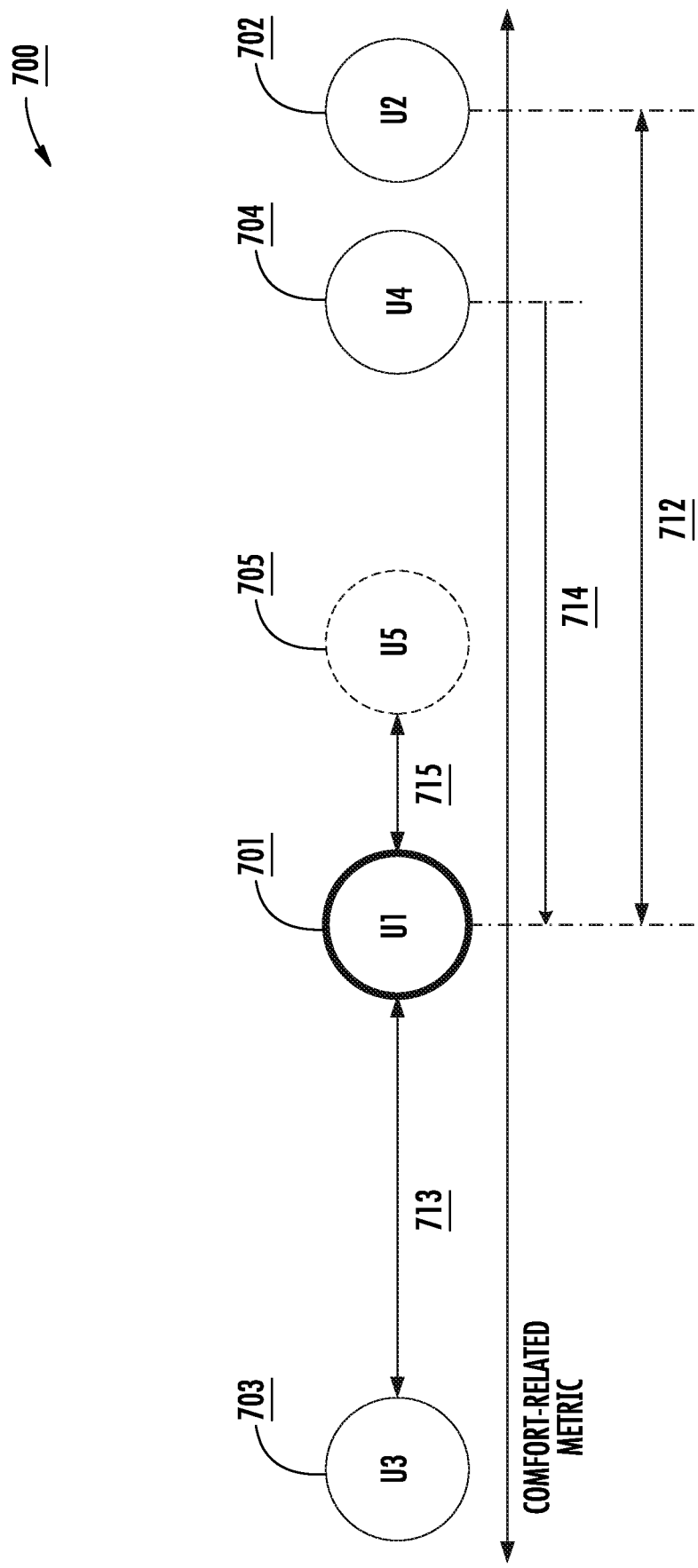

FIG. 7 provides an operational example of a cross-profile prior modeling space in accordance with one embodiment of the present disclosure.

Figure 8:
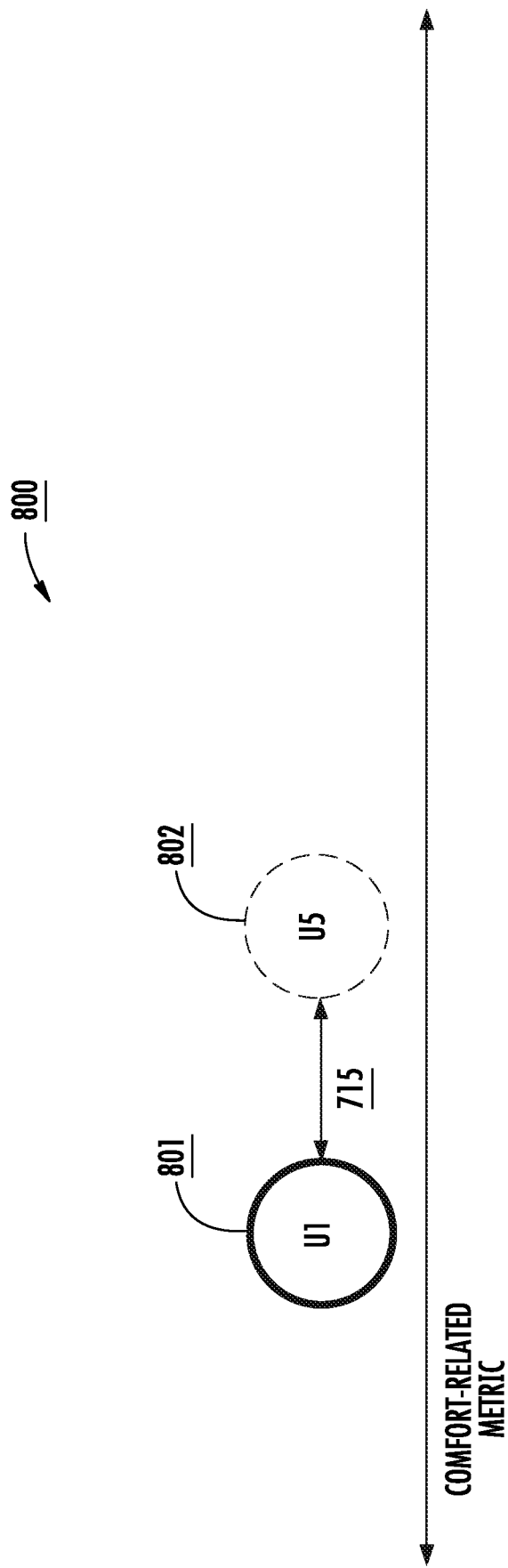

FIG. 8 provides an operational example of a cross-profile extrapolation space in accordance with one embodiment of the present disclosure.

Figure 9:
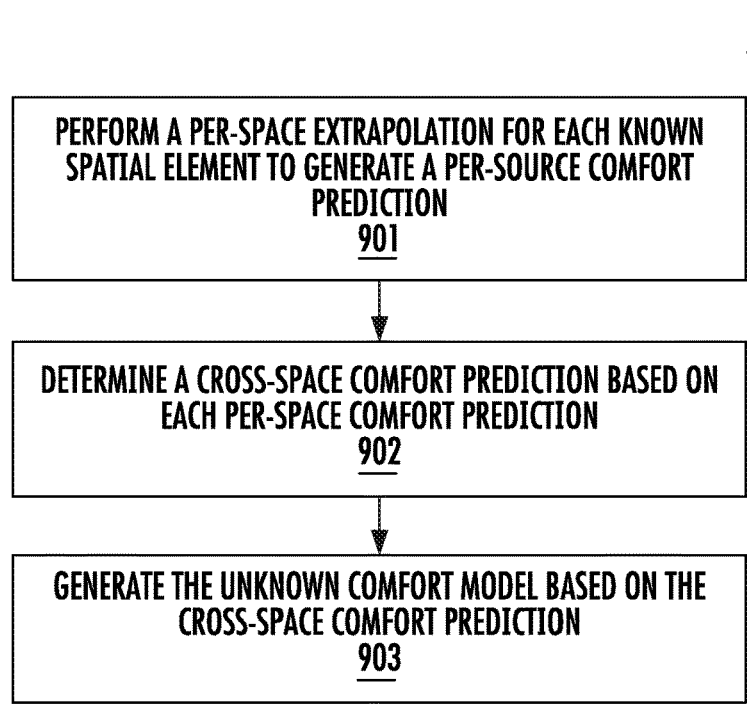

FIG. 9 is a flowchart diagram of an example process for generating an unknown comfort model using cross-space extrapolations in accordance with one embodiment of the present disclosure.

Figure 10:
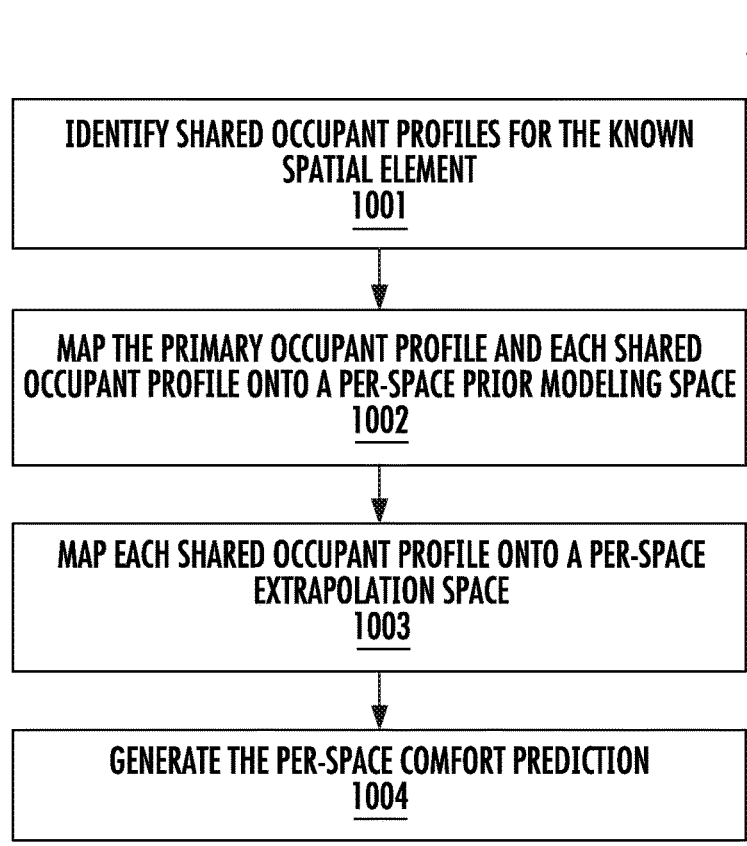

FIG. 10 is a flowchart diagram of an example process for generating a per-space comfort prediction in accordance with one embodiment of the present disclosure.

Figure 11:
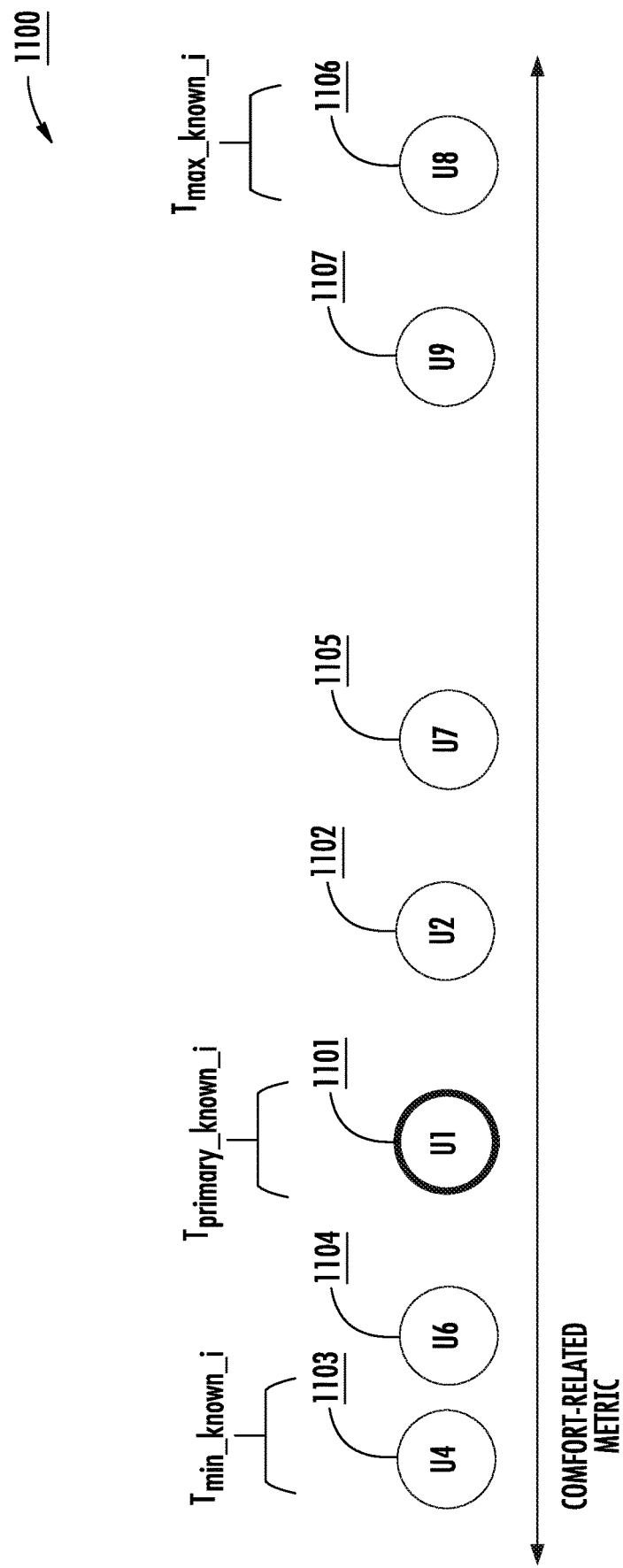

FIG. 11 provides an operational example of a per-space prior modeling space in accordance with one embodiment of the present disclosure.

Figure 12:
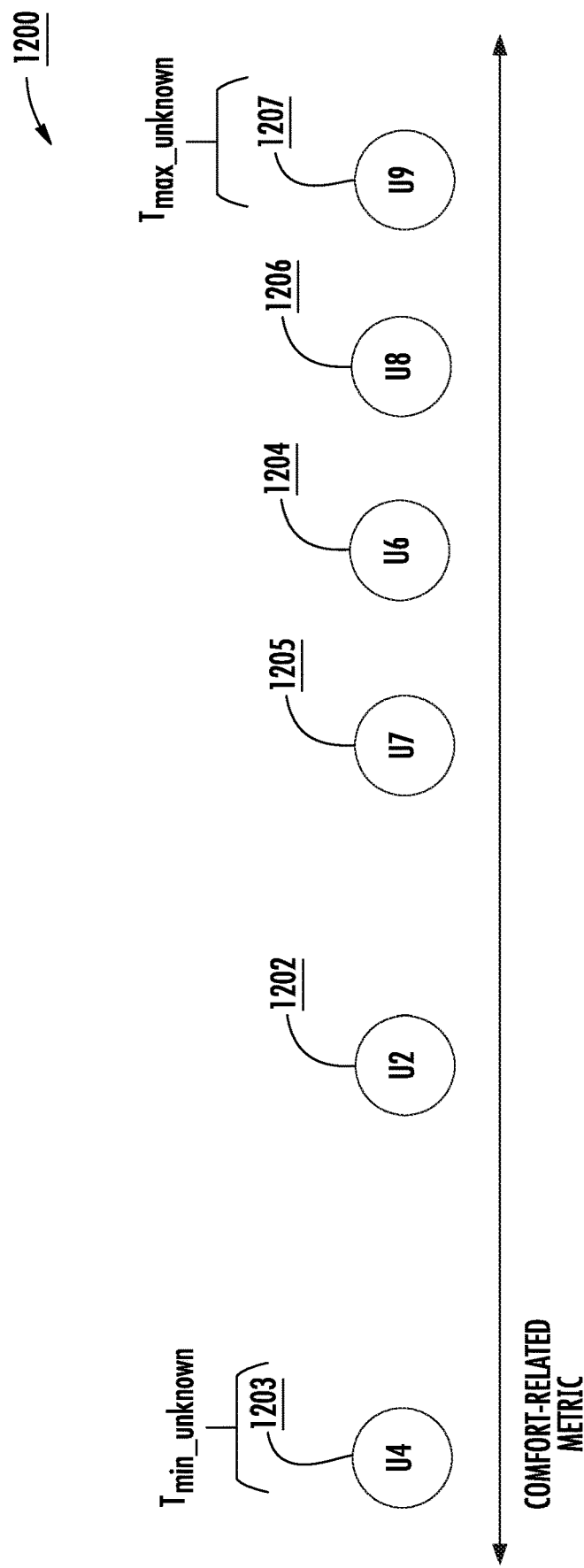

FIG. 12 provides an operational example of a cross-space extrapolation space in accordance with one embodiment of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a device is described herein to receive data from another device, it will be appreciated that the data may be received directly from another device or may be received indirectly via one or more intermediary devices, such as, for example, one or more servers, relays, routers, network access points, base stations, hosts, and/or the like (sometimes referred to herein as a "network"). Similarly, where a device is described herein to send data to another device, it will be appreciated that the data may be sent directly to another device or may be sent indirectly via one or more intermediary devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Overview

Various embodiments of the present disclosure provide techniques for improving adaptability of comfort management systems. Comfort management systems maintain comfort preference information (e.g., comfort models) for various occupants of a building and enable utilization of such comfort preference information to enhance occupant experience. However, in the absence of defined comfort preference information for particular occupant profiles such as incoming occupant profiles and/or visitor occupant profiles, many existing comfort management systems fail to effectively and efficiently infer such comfort preference information. This in turn makes the noted comfort management systems unreliable and ineffective for more complex operational environments involving large numbers of occupant profiles, large numbers of spatial elements, large numbers of spatial variables, large numbers of per-occupant comfort models, significant changes in the occupant profile makeup of buildings over time, significant fluctuations in architectural composition of buildings over time, etc. For example, because of such limited adaptability issues, many existing comfort management systems suffer from substantial drawbacks in effectively and reliably initializing occupant comfort models for incoming occupant profiles, such as incoming employees and/or incoming visitors, and/or in effectively and reliably initializing occupant comfort models for newer spatial elements within buildings, e.g., newly constructed and/or newly remodeled rooms within the buildings.

Various embodiments of the present disclosure address the noted adaptability challenges of many existing comfort management systems. For example, various embodiments of the present disclosure enable efficient and effective generation of comfort models by using at least one of cross-comfort-model extrapolation, cross-occupant-profile extrapolation, and cross-spatial-element extrapolation. Through the noted techniques, various embodiments of the present disclosure enable effective and efficient extrapolation of comfort models in a manner that addresses needs of complex operational environments involving large numbers of occupant profiles, large numbers of spatial elements, large numbers of spatial variables, large numbers of per-occupant comfort models, significant changes in the occupant profile makeup of buildings over time, significant fluctuations in architectural composition of buildings over time, etc. By addressing adaptability challenges of many existing comfort management systems, various embodiments of the present disclosure make significant technical contributions to facilitating effective and efficient initialization of comfort models for incoming occupant profiles and/or new spatial elements within buildings. In doing so, various embodiments of the present disclosure make significant technical contributions to comfort management systems and advance technical frontiers in related areas.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the device may include fixed devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example architecture 100 within which embodiments of the present disclosure may operate. The architecture 100 includes a comfort management computing device 106 which interacts with one or more client computing devices 103, such as client computing device A 103A, client computing device B 103B, and client computing device C 103C. The comfort management computing device 106 may communicate with at least some of the client computing devices 103 over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network may include a cellular telephone, an 902.11, 902.16, 902.20, and/or WiMax network. Further, the communication network may include a public network, such as the Internet, a private network, such as an intranet, or combinations thereof, and may utilize a variety of networking protocols now available or later developed including, but not limited to TCP/IP based networking protocols. In one embodiment, the protocol is a custom protocol of JSON objects sent via a Websocket channel. In one embodiment, the protocol is JSON over RPC, JSON over REST/HTTP, and the like.

The comfort management computing device 106 may be configured to enable occupant profiles associated with the client computing devices 103 to manage and utilize comfort models, where the comfort models may indicate user preferences with respect to various features (e.g., temperature, humidity, lighting, etc.) of various spaces within one or more buildings. For example, the comfort management computing device 106 may be configured to maintain comfort models for various occupant profiles each corresponding to an employee working in an office building. Moreover, the comfort management computing device 106 may be configured to perform office space allocation and/or meeting room allocation in accordance with the maintained comfort models for the office building.

The occupant profiles may communicate with the comfort management computing device 106 using the client computing devices 103. For example, the occupant profiles may communicate with the comfort management computing device 106 to provide feedback data which can in turn be used to define comfort models. As another example, the occupant profiles may communicate with the comfort management computing device 106 to provide requests for office space allocation and/or meeting room allocation. As a further example, the occupant profiles may communicate with the comfort management computing device 106 to provide modifications to configuration data utilized to define comfort parameters associated with the comfort model and/or associated with the comfort preferences.

An example architecture for a comfort management computing device 106 is depicted in the apparatus 200 of FIG. 2. As depicted in FIG. 2, the apparatus 200 includes processor 202, memory 204, input/output circuitry 206, and communications circuitry 208. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In one embodiment, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus 200 to carry out various functions in accordance with example embodiments of the present disclosure.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, if configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure the processor 202 to perform the algorithms and/or operations described herein when the instructions are executed.

In one embodiment, the apparatus 200 may include input/output circuitry 206 that may, in turn, be in communication with processor 202 to provide output to the user and, In one embodiment, to receive an indication of a user input. The input/output circuitry 206 may comprise a user interface and may include a display, and may comprise a web user interface, a mobile application, a client device, a kiosk, or the like. In one embodiment, the input/output circuitry 206 may also include a keyboard, a mouse, a joystick, a touch screen, touch areas, soft keys, a microphone, a speaker, or other input/output mechanisms.

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of commands via the antenna/antennae or to handle receipt of commands received via the antenna/antennae.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

An example architecture for the client computing device 103 is depicted in the apparatus 300 of FIG. 3. As depicted in FIG. 3, the apparatus 300 includes processor 303, memory 304, input/output circuitry 306, and communications circuitry 308. Although these components 303-308 are described with respect to functional limitations, it should be understood that the particular implementations necessarily include the use of particular hardware. It should also be understood that certain of these components 303-308 may include similar or common hardware. For example, two sets of circuitries may both leverage use of the same processor, network interface, storage medium, or the like to perform their associated functions, such that duplicate hardware is not required for each set of circuitries.

In one embodiment, the processor 303 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may be configured to store information, data, content, applications, instructions, or the like for enabling the apparatus to carry out various functions in accordance with example embodiments of the present disclosure.

The processor 303 may be embodied in a number of different ways and may, for example, include one or more processing devices configured to perform independently. In some preferred and non-limiting embodiments, the processor 303 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 303 may be configured to execute instructions stored in the memory 304 or otherwise accessible to the processor 302. In some preferred and non-limiting embodiments, the processor 303 may be configured to execute hard-coded functionalities. As such, if configured by hardware or software methods, or by a combination thereof, the processor 303 may represent an entity (e.g., physically embodied in circuitry) capable of performing operations according to an embodiment of the present disclosure while configured accordingly. Alternatively, as another example, when the processor 303 is embodied as an executor of software instructions, the instructions may specifically configure the processor 303 to perform the algorithms and/or operations described herein when the instructions are executed.

In one embodiment, the apparatus 300 may include input/output circuitry 306 that may, in turn, be in communication with processor 303 to provide output to the user and, in one embodiment, to receive an indication of a user input. The input/output circuitry 306 may comprise a user interface and may include a display, and may comprise a web user interface, a mobile application, a client device, a kiosk, or the like. In one embodiment, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network.

For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of commands via the antenna/antennae or to handle receipt of commands received via the antenna/antennae.

It is also noted that all or some of the information discussed herein can be based on data that is received, generated and/or maintained by one or more components of apparatus 300. In one embodiment, one or more external systems (such as a remote cloud computing and/or data storage system) may also be leveraged to provide at least some of the functionality discussed herein.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Disclosure

Various embodiments of the present disclosure provide techniques for improving adaptability of comfort management systems. Comfort management systems maintain comfort preference information (e.g., comfort models) for various occupants of a building and enable utilization of such comfort preference information to enhance occupant experience. However, in the absence of defined comfort preference information for particular occupant profiles such as incoming occupant profiles and/or visitor occupant profiles, many existing comfort management systems fail to effectively and efficiently infer such comfort preference information. This in turn makes the noted comfort management systems unreliable and ineffective for more complex operational environments involving large numbers of occupant profiles, large numbers of spatial elements, large numbers of spatial variables, large numbers of per-occupant comfort models, significant changes in the occupant profile makeup of buildings over time, significant fluctuations in architectural composition of buildings over time, etc. For example, because of such limited adaptability issues, many existing comfort management systems suffer from substantial drawbacks in effectively and reliably initializing occupant comfort models for incoming occupant profiles, such as incoming employees and/or incoming visitors, and/or in effectively and reliably initializing occupant comfort models for newer spatial elements within buildings, e.g., newly constructed and/or newly remodeled rooms within the buildings.

Various embodiments of the present disclosure address the noted adaptability challenges of many existing comfort management systems. For example, various embodiments of the present disclosure enable efficient and effective generation of comfort models by using at least one of cross-comfort-model extrapolation, cross-occupant-profile extrapolation, and cross-spatial-element extrapolation.

Through the noted techniques, various embodiments of the present disclosure enable effective and efficient extrapolation of comfort models in a manner that addresses needs of complex operational environments involving large numbers of occupant profiles, large numbers of spatial elements, large numbers of spatial variables, large numbers of per-occupant comfort models, significant changes in the occupant profile makeup of buildings over time, significant fluctuations in architectural composition of buildings over time, etc. By addressing adaptability challenges of many existing comfort management systems, various embodiments of the present disclosure make significant technical contributions to facilitating effective and efficient initialization of comfort models for incoming occupant profiles and/or new spatial elements within buildings. In doing so, various embodiments of the present disclosure make significant technical contributions to comfort management systems and advance technical frontiers in related areas.

Cross-Model Extrapolation

FIG. 4 is a data flow diagram of an example process 400 for generating an unknown comfort model 412 for a primary occupant profile with respect to an unknown spatial element based on cross-model extrapolations, i.e., by inferring the unknown comfort model 412 based on a group of known comfort models 411, such as known comfort models 411 associated with the primary occupant profile and/or known comfort models 411 associated with one or more secondary occupant profiles other than the primary occupant profile.

As used herein, a particular comfort model associated with a particular occupant profile (e.g., a particular user profile) and a profile spatial element (e.g., a particular room, a particular building, etc.) may be a data object that describes one or more comfort preferences of the particular occupant profile with respect to the particular spatial element, where each comfort preference may in turn be defined based on one or more spatial variables (e.g., temperature, humidity, lighting, air quality, etc.). For example, a particular comfort model may describe preferences of a particular occupant profile with respect to temperature of a particular room. In the noted example, the particular comfort model may determine, for each temperature range of one or more temperature ranges, a corresponding preference value which indicates how much the occupant profile prefers or "likes" the temperature range when the temperature range is maintained in the particular room. Exemplary comfort models 102-1, 102-2, 102-3, 102-4, 102-5, and 102-6—each describing preferences of a corresponding occupant profile with respect to air temperature of a particular spatial element—are depicted in the comfort model graphical representation 500 of FIG. 5. The comfort preferences characterizing the comfort models may be determined based on at least one of user preference feedback data, default comfort preference information, and cross-model extrapolations, such as the cross-model extrapolations described herein. While exemplary comfort models 102-1, 102-2, 102-3, 102-4, 102-5, and 102-6 all have a linear structure, a person of ordinary skill in the relevant technology may realize that comfort models may have a non-linear structure, such as a curved structure.

The unknown comfort model 412 may be a comfort model which describes one or more predicted comfort preferences of the particular primary occupant profile with respect to the unknown spatial element. In some embodiments, the unknown spatial element is a spatial element without a retrievable comfort model associated with the primary occupant profile. In some embodiments, the unknown spatial element is a spatial element with a retrievable comfort model associated with the primary occupant profile, where the retrievable comfort model associated with the unknown spatial element and the primary occupant profile is nevertheless deemed outdated. For example, the comfort management computing device 106 may determine that a comfort model for a particular occupant profile and a particular spatial element is outdated if a threshold amount of time has passed since the generation of the particular comfort model. As another example, the comfort management computing device 106 may determine that a comfort model for a particular occupant profile and a particular spatial element is outdated if the particular spatial element has undergone significant transformations (e.g., size expansions, smart glass window installments, air-conditioning system upgrades, etc.) since the generation of the particular comfort model.

To generate the unknown comfort model 412 by utilizing the cross-model extrapolations, the comfort management computing device 106 may utilize known comfort models 411 as prior information used to perform the cross-model extrapolations. The known comfort models 411 may include at least one of cross-space comfort models 401, cross-profile comfort models 402, and cross-context comfort models 403.

A cross-space comfort model 401 is a comfort model associated with the primary occupant profile and a known spatial element which is different from the unknown spatial element. For example, if the primary occupant profile is user profile U1 and the unknown spatial element is room R1, the cross-space comfort models 401 may include a known comfort model for the user profile U1 and a room R2, if the user profile U1 indeed has a known comfort model with respect to the room R2. In some embodiments, a known spatial element is a spatial element with respect to which the primary occupant profile has a defined comfort model (e.g., a comfort model inferred based on initial preference information).

A cross-profile comfort model 402 is a comfort model associated with a secondary occupant profile that is different from the primary occupant profile and the unknown spatial element. For example, if the primary occupant profile is user profile U1 and the unknown spatial element is room R1, the cross-profile comfort models 402 may include a known comfort model for a user profile U2 and the room R1, where the user profile U2 indeed has a known comfort model with respect to the room R1. In some embodiments, a secondary occupant profile is an occupant profile that has a defined comfort model with respect to the unknown spatial element and at least one known spatial element (e.g., one known spatial element, a threshold number of known spatial elements, all known spatial elements, etc.). In some embodiments, a secondary occupant profile is an occupant profile that has a defined comfort model with respect to the unknown spatial element, has a defined comfort model with respect to at least one known spatial element, and has one or more shared features in common with the primary occupant profile (e.g., has properties deemed sufficiently similar to properties of the primary occupant profile and/or is associated with a climate that is sufficiently similar to a climate associated with the primary occupant profile).

A cross-context comfort model 403 is a comfort model associated with a secondary occupant profile that is different from the primary occupant profile and a known spatial element that is different from the unknown spatial element. For example, if the primary occupant profile is user profile U1 and the unknown spatial element is room R1, the cross-context comfort models 403 may include a known comfort model for a user profile U2 and a room R2, where the user profile U2 indeed has a known comfort model with respect to the room R2. In some embodiments, given a primary occupant profile with primary known comfort models with respect to known spatial elements, and further given a group of secondary occupant profiles with secondary known comfort models with respect to the known spatial elements and secondary unknown comfort models with respect to the unknown spatial element, the comfort management computing device 106 extrapolates the unknown comfort model 412 from the secondary unknown comfort models, e.g., by adjusting the secondary unknown comfort models in accordance with deviation measures between the primary known comfort models and the secondary known comfort models.

Cross-Profile Extrapolation

In some embodiments, performing the cross-model extrapolations to generate the unknown comfort model 412 includes performing a cross-profile extrapolation based on the known comfort models 411. In some of those embodiments, generating the unknown comfort model 412 based on the cross-profile extrapolation can be performed in accordance with the operations of process 600 depicted in FIG. 6.

As depicted in FIG. 6, the process 600 begins at operation 601 when the comfort management computing device 106 maps the cross-space comfort models 401 and the cross-context comfort models 403 onto a cross-profile prior modeling space for the known spatial elements. In some embodiments, to map the cross-space comfort models 401 and the cross-context comfort models 403 onto the cross-profile prior modeling space, the comfort management computing device 106 performs the following operations: (i) generating, based on the cross-space comfort models 401, a first comfort preference aggregation for the primary occupant profile with respect to the one or more known spatial elements; (ii) generating, for each secondary occupant model and based on the cross-context comfort models 403 for the particular secondary occupant model, a second comfort preference aggregation for the particular secondary occupant model; and (iii) mapping the first comfort preference aggregation and each second comfort preference aggregation onto the cross-profile prior modeling space.

For example, given a primary occupant profile U1 with defined comfort models for rooms R1-R3 but without a defined comfort model for room R4 as well as secondary occupant profiles U2-U5 each with defined comfort models for rooms R1-R4, the comfort management computing device 106 may determine, for each occupant profile U1-U5, a measure of statistical distribution (e.g., a mean, a median, a mode, etc.) of the defined comfort models of the particular occupant profile with respect to rooms R1-R3 and utilize the measure of statistical distribution to generate a comfort preference aggregation for the particular occupant profile with respect to rooms R1-R3 (i.e., with respect to the known spaces shared among the occupant profiles U1-U5). The comfort management computing device 106 may then map each comfort preference aggregation onto the cross-profile prior modeling space.

An operational example of a cross-profile prior modeling space 700 is presented in FIG. 7. As depicted in FIG. 7, the cross-profile prior modeling space 700 indicates a comfort preference aggregation 701 for a primary occupant profile U1 as well as a comfort preference aggregation 702-705 for each secondary occupant profile U2-U5. In the depicted cross-profile prior modeling space 700, each comfort preference aggregation 701-705 may indicate preferences of a corresponding occupant profile with respect to one or more comfort-related measurements (e.g., temperature, pressure, humidity, sunlight, etc.). In some embodiments, at least one comfort preference aggregation 702-705 may indicate an aggregation of comfort preferences of multiple secondary occupant profiles (e.g., multiple occupant profiles deemed closest to the primary occupant profile).

At operation 602, the comfort management computing device 106 identifies a predefined number of (e.g., one) proximate occupant profiles relative to the primary occupant profile based on the cross-profile prior modeling space. In some embodiments, to identify the predefined number of proximate occupant profiles relative to the primary occupant profile, the comfort management computing device 106 performs the following operations: (i) generating, for each secondary occupant, a preference distance measure between the first comfort preference aggregation for the primary occupant profile and the second comfort preference aggregation for the secondary occupant profile; and (ii) identifying, based on each preference distance measure for a secondary occupant, one or more of the secondary occupant profiles as the proximate occupant profiles. For example, as depicted in FIG. 7, the comfort management computing device 106 determines the preference distance measure 712 between the primary occupant profile U1 and the secondary occupant profile U2, the preference distance measure 713 between the primary occupant profile U1 and the secondary occupant profile U3, the preference distance measure 714 between the primary occupant profile U1 and the secondary occupant profile U4, and the preference distance measure 715 between the primary occupant profile U1 and the secondary occupant profile U5. Moreover, as further depicted in FIG. 7, the comfort management computing device 106 selects the secondary occupant profile having the lowest respective preference distance measure, i.e., the secondary occupant profile U5 having the preference distance measure 715, as the proximate occupant profile for the primary occupant profile U1.

At operation 603, the comfort management computing device 106 generates the unknown comfort model 412 based on the cross-profile comfort models 402 for the proximate occupant profiles. In some embodiments, to generate the unknown comfort model 412 based on the cross-profile comfort models 402 for the proximate occupant profiles, the comfort management computing device 106 performs the following operations: (i) generating, for each proximate occupant profile, a third comfort preference aggregation associated with the unknown spatial element based on the cross-context comfort model for the proximate occupant profile; and (iii) generating the unknown comfort model 412 based on each third comfort preference aggregation for a proximate occupant profile and each preference distance measure for a proximate occupant profile. In some of those embodiments, generating the unknown comfort model based on each third comfort preference aggregation model and each preference distance measure comprises generating an initial comfort preference aggregation for the primary occupant profile based on each third comfort preference aggregation, generating an initial preference offset for the initial comfort preference aggregation based on each preference distance measure, and generating the unknown comfort model based on the initial comfort preference aggregation and the initial preference offset.

For example, given a primary occupant profile U1 associated with a first comfort preference aggregation T1 as well as a proximate occupant profile U5 associated with a second comfort preference aggregation T2 and a third comfort preference aggregation T3, the comfort management computing device 106 may generate the unknown comfort model 412 in accordance with a probability distribution characterized by a distribution parameter determined at least in part using cross-profile extrapolation and based on T3−(T2−T1). An operational example of this aspect of cross-profile extrapolation is depicted using the cross-profile extrapolation space 800 of FIG. 8. As depicted in FIG. 8, the comfort management computing device 106 maps the primary occupant profile U1 onto the cross-profile extrapolation space 800 using the extrapolated comfort preference aggregation 801. To perform this mapping, the comfort management computing device 106 identifies a point in the cross-profile extrapolation space 800 based on the comfort preference aggregation 802 for the proximate occupant profile U5 and the preference distance measure 715 between the temperature-related comfort preference aggregation 701 for the primary occupant profile U1 and the temperature-related comfort preference aggregation 705 for the proximate occupant profile U5. In some embodiments, the extrapolated comfort preference aggregation 801 does not have to be an absolute distance 715, but a relative one, e.g. may be calculated using the equation 801=802*(1−(705−701)/705), and/or based on the equation T=T3*(1−(T2−T1)/T2)," where T denotes the unknown comfort model.

In some embodiments, cross-profile extrapolation is only performed when the lowest predefined distance measure between the comfort preference aggregation for the primary occupant profile with respect to the known spatial elements and a particular comfort preference aggregation for a particular secondary occupant profiles with respect to the known spatial elements is below a certain threshold (e.g., below 3 degrees for temperature-related comfort preference aggregations). In some embodiments, the comfort management computing device 106 selects the known spatial elements from a group of candidate known spatial elements in order to keep the lowest predefined distance measure below a certain threshold (e.g., below 3 degrees for temperature-related comfort preference aggregations). In some embodiments, the comfort management computing device 106 selects the known spatial elements from a group of candidate known spatial elements in order to minimize the lowest predefined distance measure.

Cross-Space Extrapolation

In some embodiments, performing the cross-model extrapolations to generate the unknown comfort model 412 includes performing a cross-space extrapolation based on the known comfort models 411. In some of those embodiments, performing the cross-space extrapolation based on the known comfort models 411 can be performed in accordance with the operations of process 900 depicted in FIG. 9. As depicted in FIG. 9, the process 900 begins at operation 901 when the comfort management computing device 106 performs a per-space extrapolation for each known spatial element to generate a per-space comfort prediction associated with the known spatial element.

In some embodiments, the per-space comfort prediction associated with a particular known spatial element is a predicted parameter of statistical distribution for the comfort model associated with the primary occupant profile and the unknown spatial element, where the predicted parameter of statistical distribution is determined based on the comfort models for shared occupant profiles that each have both a defined comfort model associated with the unknown spatial element and a defined comfort model associated with the particular known spatial element. For example, to determine the comfort model for the occupant profile U1 and spatial element R1, given that the spatial element R1 is associated with defined comfort models for occupant profiles U2-U5 and that a spatial element R2 is associated with defined comfort models for occupant profiles U4-U7, the comfort management computing device 106 may determine a per-space comfort prediction associated with the spatial element R2 based on the comfort models for occupant profiles U4-U5 with respect to each of the spatial element R1 and the spatial element R2. The determined per-space comfort prediction associated with the spatial element R2 may indicate a predicted parameter of statistical distribution for the comfort model associated with the occupant profile U1 and the spatial element R1.

In some embodiments, when performed with respect to a particular known spatial element, operation 901 may be performed in accordance with the operations of the process depicted in FIG. 10. The process depicted in FIG. 10 begins at operation 1001 when the comfort management computing device 106 identifies one or more shared occupant profiles for the particular known spatial element. In some embodiments, a shared occupant profile for the particular known spatial element is an occupant profile that both has a defined comfort model with respect to the particular known spatial element and has a defined comfort model with respect to the unknown spatial element.

At operation 1002, the comfort management computing device 106 maps the primary occupant profile and each shared occupant profile for the particular known spatial element onto a per-space prior modeling space for the particular known spatial element. In some embodiments, to map the primary occupant profile and each shared occupant profile onto the per-space prior modeling space for the particular known spatial element, the comfort management computing device 106 performs the following operations: (i) generating a known per-space comfort preference aggregation for the primary occupant profile, (ii) generating a known per-space comfort preference aggregation for each shared occupant profile associated with the particular known spatial element, and (iii) mapping each known per-space comfort preference aggregation onto the per-space prior modeling space for the particular known spatial element. An operational example of a per-space prior modeling space 1100 for a particular known spatial element is presented in FIG. 11. As depicted in FIG. 11, the per-space prior modeling space 1100 includes the known per-space comfort preference aggregation 1101 for the primary occupant profile U1 as well as known per-space comfort preference aggregations 1102-1107 for shared occupant profiles U2, U4, U6, U7, U8, and U9.

Returning to FIG. 10, at operation 1003, the comfort management computing device 106 maps each shared occupant profile for the particular known spatial element onto a cross-space extrapolation space associated with the particular known spatial element. In some embodiments, to map each shared occupant profile onto the per-space prior extrapolation space associated with the particular known spatial element, the comfort management computing device 106 performs the following operations: (i) generating an unknown per-space comfort preference aggregation for each shared occupant profile, and (ii) mapping each unknown per-space comfort preference aggregation onto the per-space prior extrapolation space associated with the particular known spatial element. An operational example of a cross-space extrapolation space 1200 for a particular known spatial element is presented in FIG. 12. As depicted in FIG. 12, the cross-space extrapolation space 1200 includes unknown per-space comfort preference aggregations 1202-1107 for shared occupant profiles U2, U4, U6, U7, U8, and U9 respectively.

Returning to FIG. 10, at operation 1004, the comfort management computing device 106 generates the per-space comfort prediction for the particular known spatial element based on a range of values associated with the per-space prior modeling space for the particular known spatial element and a range of values associated with the cross-space extrapolation space for the unknown spatial element. In some embodiments, the comfort management computing device 106 generates a per-space comfort prediction for the particular known spatial element based on a ratio of a range of values associated with the per-space prior modeling space for the particular known spatial element and a range of values associated with the cross-space extrapolation space for the unknown spatial element.

In some embodiments, to determine the range of values associated with the per-space prior modeling space for a particular known spatial element i, the comfort management computing device 106 determines: (i) a difference measure between a smallest known per-space comfort preference aggregation associated with the per-space prior modeling space for the particular known spatial element i (e.g., the $T_{min\_known\_i}$ value 1103 indicated in the example per-space prior modeling space 1100) and the largest known per-space comfort preference aggregation associated with the per-space prior modeling space for the particular known spatial element i (e.g., the $T_{max\_known\_i}$ value 1106 indicated in the example per-space prior modeling space 1100); and (ii) a difference measure between the known per-space comfort aggregation associated with the primary occupant profile according to the per-space modeling space for the particular known spatial element i (e.g., the $T_{primary\_known\_i}$ value in the example per-space prior modeling space 1100) and the smallest known per-space comfort preference aggregation associated with the per-space prior modeling space for the particular known spatial element i (e.g., the $T_{min\_known\_i}$ value 1103 indicated in the example per-space prior modeling space 1100).

In some embodiments, to determine the range of values associated with the cross-space extrapolation space for unknown spatial element, the comfort management computing device 106 computes a difference measure between a smallest unknown per-space comfort preference aggregation associated with the cross-space extrapolation space for the unknown spatial element (e.g., the $T_{min\_unknown}$ value 1203 indicated in the example cross-space extrapolation space 1200) and the largest unknown per-space comfort preference aggregation associated with the cross-space extrapolation space for the unknown spatial element (e.g., the $T_{max\_unknown}$ value 1207 indicated in the example cross-space extrapolation space 1200).

In some embodiments, to determine a per-space comfort prediction $P_i$, for the particular known spatial element i, the comfort management computing device 106 performs operations corresponding to the below equation:

$$P_i = T_{min\_unknown} + \frac{T_{max\_unknown} - T_{min\_unknown}}{T_{max\_known\_i} - T_{min\_known\_i}} * (T_{primary\_known\_i} - T_{min\_known\_i}) \quad \text{Equation 1}$$

In the above equation, $T_{min\_known\_i}$ may refer to a smallest known per-space comfort preference aggregation associated with the per-space prior modeling space for the particular known spatial element i, $T_{max\_known\_i}$ may refer to a largest known per-space comfort preference aggregation associated with the per-space prior modeling space for the particular known spatial element i, $T_{min\_unknown}$ may refer to a smallest unknown per-space comfort preference aggregation associated with the cross-space extrapolation space for the unknown spatial element, $T_{max\_unknown}$ may refer to a largest unknown per-space comfort preference aggregation associated with the cross-space extrapolation space for the unknown spatial element, and $T_{primary\_known\_i}$ may refer to the known per-space comfort aggregation associated with the primary occupant profile according to the per-space modeling space for the particular known spatial element i.

Returning to FIG. 9, at operation 902, the comfort management computing device 106 generates a measure of distribution (e.g., a mean, mean, mode, etc.) of each per-space comfort prediction for a known spatial element to determine a cross-space comfort prediction for all of the known spatial elements. At operation 903, the comfort management computing device 106 generates the unknown comfort model 412 based on the cross-space comfort prediction, e.g., by generating a probability distribution in accordance with a distribution parameter defined at least in part based on the cross-space comfort prediction for all of the known spatial elements. In some embodiments, the cross-space comfort prediction for all of the known spatial elements is a predicted measure of distribution of the unknown comfort model 412. In some embodiments, to generate the unknown comfort model 412, the comfort management computing device 106 performs the operations described by the equation: $\text{Average}_{i=1}^{n} P_i$, where n is the number of known spatial elements, i is an index variable that iterates over the n spatial elements, and $P_i$ is the per-pace comfort prediction for the particular known spatial element i.

In some embodiments, the comfort management computing device 106 only performs cross-space extrapolation when a threshold number (e.g., one) or a threshold ratio (e.g., all) of the known spatial elements have a threshold number (e.g., five) shared occupant profiles. In some embodiments, the comfort management computing device 106 selects known spatial elements from a group of candidate known spatial elements to cause a threshold number or a threshold ratio of the known spatial elements to have a threshold number shared occupant profiles. In some embodiments, in response to determining that a threshold number or a threshold ratio of the known spatial elements have a threshold number shared occupant profiles, the comfort management computing device 106 generates the unknown comfort model 412 based on cross-space extrapolation. In some embodiments, in response to determining that less than a threshold number or a threshold ratio of the known spatial elements have a threshold number shared occupant profiles, the comfort management computing device 106 generates the unknown comfort model 412 based on cross-profile extrapolation.

In some embodiments, the comfort management computing device 106 utilizes comfort models, such as the unknown comfort model 412, to assign spatial elements for particular events (e.g., meetings) and/or for particular purposes (e.g., as office spaces for particular employees). For example, the comfort management computing device 106 may obtain a location assignment request for an event associated with the primary occupant profile and process the location assignment request based on the unknown comfort model to generate a location assignment for the event. In some embodiments, at least some of the cross-space comfort models for the primary occupant profile may be generated based on initial preference information for the primary occupant profile, such as default initial preference information, template initial preference information, initial preference information determined based on survey responses (e.g., survey responses in response to questions about clothing habits), initial preference information determined based on comfort models of users deemed related to the primary occupant profile, initial preference information determined based on averages of past responses with respect to particular spatial elements, etc.

Additional Example Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs (i.e., one or more modules of computer program instructions) encoded on computer-readable storage medium for execution by, or to control the operation of, information/data processing apparatus. Alternatively, or in addition, the program instructions can be encoded on an artificially-generated propagated command (e.g., a machine-generated electrical, optical, or electromagnetic command) which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated command, a computer-readable storage medium can be a source or destination of computer program instructions encoded in an artificially-generated propagated command. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (Application Specific Integrated Circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices (e.g., EPROM, EEPROM, and flash memory devices; magnetic disks, such as internal hard disks or removable disks; magneto-optical disks; and CD-ROM and DVD-ROM disks). The processor and the memory can be supplemented by, or incorporated in, special purpose logic circuitry.

To provide for interaction with a user, embodiments of the subject matter described herein can be implemented on a computer having a display device (e.g., a CRT (cathode ray tube) or LCD (liquid crystal display) monitor) for displaying information/data to the user and a keyboard and a pointing device (e.g., a mouse or a trackball, by which the user can provide input to the computer). Other kinds of devices can be used to provide for interaction with a user as well; for example, feedback provided to the user can be any form of sensory feedback (e.g., visual feedback, auditory feedback, or tactile feedback; and input from the user can be received in any form, including acoustic, speech, or tactile input). In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component (e.g., as an information/data server), or that includes a middleware component (e.g., an application server), or that includes a front-end component (e.g., a client device having a graphical user interface or a web browser through which a user can interact with an implementation of the subject matter described herein), or any combination of one or more such back-end, middleware, or front-end components. The components of the system can be interconnected by any form or medium of digital information/data communication (e.g., a communication network). Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A method comprising:
    obtaining a plurality of known comfort models, wherein the plurality of known comfort models comprise at least one of: (i) one or more cross-space comfort models each associated with a primary occupant profile and a known spatial element of one or more known spatial elements, (ii) one or more cross-profile comfort models each associated with a secondary occupant profile of one or more secondary occupant profiles and an unknown spatial element, and (iii) one or more cross-context comfort models each associated with the secondary occupant profile of the one or more secondary occupant profiles and the known spatial element of the one or more known spatial elements;
    extrapolating the at least one of the plurality of known comfort models to generate the unknown comfort model for the primary occupant profile with respect to the unknown spatial element; and
    implementing a comfort model to control one or more spatial variables based on the unknown comfort model.

2. The method of claim 1, wherein performing extrapolation by implementing the cross profile model comprises:
    generating, a first comfort preference aggregation for the primary occupant profile with respect to the one or more known spatial elements;
        generating, for each secondary occupant profile of the one or more secondary occupant profiles, a second comfort preference aggregation associated with the one or more known spatial elements;
    generating, for each secondary occupant profile of the one or more secondary occupant profiles, a preference distance measure between the first comfort preference aggregation for the primary occupant profile and the second comfort preference aggregation for the secondary occupant profile;
        identifying, based on each preference distance measure for a secondary occupant profile of the one or more secondary occupant profiles, one or more proximate occupant profiles of the one or more secondary occupant profiles;
        generating, for each proximate occupant profile of the one or more proximate occupant profiles, a third comfort preference aggregation associated with the unknown spatial element based on the cross-context comfort model for the proximate occupant profile; and
        generating the unknown comfort model based on each third comfort preference aggregation for a proximate occupant profile of the one or more proximate occupant profiles.

3. The method of claim 2, wherein generating the unknown comfort model comprises:
    generating an initial comfort preference aggregation for the primary occupant profile based on each third comfort preference aggregation;

generating an initial preference offset for the initial comfort preference aggregation based on each preference distance measure; and generating the unknown comfort model based on the initial comfort preference aggregation and the initial preference offset.

4. The method of claim 1, wherein generating the unknown comfort model by performing the cross-space extrapolation comprises:

identifying a plurality of target occupant profiles for the known spatial element, wherein the plurality of target occupant profiles comprise the primary occupant profile and one or more shared occupant profiles, and wherein each shared occupant profile of the one or more shared occupant profiles for the known spatial element is associated with a first defined comfort model with respect to each known spatial element of the one or more known spatial elements and a second defined comfort model with respect to the unknown spatial element;

generating an unknown per-space comfort preference aggregation for each per-space occupant profile of the plurality of per-space occupant profiles with respect to the known spatial element;

for each known spatial element of the one or more known spatial elements:

generating a known per-space comfort preference aggregation for each shared occupant profile of the one or more shared occupant profiles with respect to the known spatial element, and generating a per-space comfort prediction for the known spatial element based on: (i) a first range of each known per-space comfort preference aggregation for a shared occupant profile of the one or more shared occupant profiles with respect to the known spatial element, (ii) a second range of each unknown per-space comfort preference aggregation for a target occupant profile of the plurality of target occupant profiles, and (iii) a primary known per-space comfort preference aggregation for the primary occupant profile with respect to the known spatial element; and generating the unknown comfort model based on each per-space comfort prediction for a known spatial element of the one or more known spatial elements.

5. The method of claim 4, wherein the per-space distribution indicator for a known spatial element of the one or more known spatial elements is determined further based on a per-space distance between the known per-space comfort preference aggregation for the primary occupant profile and an extremum known per-source comfort preference aggregation associated with the known spatial element.

6. The method of claim 1, wherein generating the unknown comfort model comprises:

for each known spatial element of the one or more spatial elements, identifying a plurality of per-space occupant profiles, wherein the plurality of per-space occupant profiles for the known spatial element comprise the primary occupant profile and one or more shared occupant profiles for the known spatial element, and wherein each shared occupant profile of the one or more shared occupant profiles for the known spatial element is associated with a first defined comfort model with respect to the known spatial element and a second defined comfort model with respect to the unknown spatial element;

determining whether the one or more known spatial elements comprise a first threshold number of spatial elements each having a second threshold number of shared occupant profiles;

in response to determining that the one or more known spatial elements comprise the first threshold number of spatial elements, generating the unknown comfort model by performing a cross-space extrapolation based on the plurality of known comfort models; and in response to determining that the one or more known spatial elements fail to comprise the first threshold number of spatial elements, generating the unknown comfort model by performing a cross-profile extrapolation based on the plurality of known comfort models.

7. The method of claim 1, further comprising:

obtaining a location assignment request for an event associated with the primary occupant profile; and processing the location assignment request based on the unknown comfort model to generate a location assignment for the event.

8. The method of claim 1, further comprising:

mapping the primary occupant profile and each shared occupant profile onto a per-space prior modeling space for the known spatial element;

generating a known per-space comfort preference aggregation for the primary occupant profile;

generating the known per-space comfort preference aggregation for the each shared occupant profile associated with the known spatial element; and mapping the each known per-space comfort preference aggregation onto the per-space prior modeling space for the known spatial element.

9. The method of claim 1, further comprising:

mapping each shared occupant profile onto a per-space prior extrapolation space associated with the known spatial element;

generating an unknown per-space comfort preference aggregation for each shared occupant profile; and mapping each unknown per-space comfort preference aggregation onto the per-space prior extrapolation space associated with the known spatial element.

10. The method of claim 1, further comprising:

determining a per-space comfort prediction $P_i$ for the known spatial element $i$ by performing operations on;

a smallest known per-space comfort preference aggregation associated with a per-space prior modeling space for the known spatial element $i$;

a largest known per-space comfort preference aggregation associated with the per-space prior modeling space for the known spatial element $i$;

a smallest unknown per-space comfort preference aggregation associated with a cross-space extrapolation space for the unknown spatial element;

a largest unknown per-space comfort preference aggregation associated with the cross-space extrapolation space for the unknown spatial element; and a known per-space comfort aggregation associated with the primary occupant profile according to the per-space modeling space for the known spatial element $i$.

11. The method of claim 1, further comprising:

determining the comfort model for an occupant profile and a spatial element is outdated if a threshold amount of time has passed since the generation of the comfort model.

12. An apparatus comprising at least one processor and at least one non-transitory memory comprising program code, wherein the at least one non-transitory memory and the program code are configured to, with the at least one processor, cause the apparatus to at least perform a method, the method comprising:

obtaining a plurality of known comfort models, wherein the plurality of known comfort models comprise at least one of: (i) one or more cross-space comfort models each associated with a primary occupant profile and a known spatial element of one or more known spatial elements, (ii) one or more cross-profile comfort models each associated with a secondary occupant profile of one or more secondary occupant profiles and an unknown spatial element, and (iii) one or more cross-context comfort models each associated with the secondary occupant profile of the one or more secondary occupant profiles and the known spatial element of the one or more known spatial elements;

extrapolating the at least one of the plurality of known comfort models to generate the unknown comfort model for the primary occupant profile with respect to the unknown spatial element; and implementing a comfort model to control one or more spatial variables based on the unknown comfort model.

13. The apparatus of claim 12, wherein performing extrapolation by implementing the cross profile model comprises:

generating, a first comfort preference aggregation for the primary occupant profile with respect to the one or more known spatial elements;

generating, for each secondary occupant profile of the one or more secondary occupant profiles, a second comfort preference aggregation associated with the one or more known spatial elements;

generating, for each secondary occupant profile of the one or more secondary occupant profiles, a preference distance measure between the first comfort preference aggregation for the primary occupant profile and the second comfort preference aggregation for the secondary occupant profile;

identifying, based on each preference distance measure for a secondary occupant profile of the one or more secondary occupant profiles, one or more proximate occupant profiles of the one or more secondary occupant profiles;

generating, for each proximate occupant profile of the one or more proximate occupant profiles, a third comfort preference aggregation associated with the unknown spatial element based on the cross-context comfort model for the proximate occupant profile; and generating the unknown comfort model based on each third comfort preference aggregation for a proximate occupant profile of the one or more proximate occupant profiles.

14. The apparatus of claim 13, wherein generating the unknown comfort model comprises:

generating an initial comfort preference aggregation for the primary occupant profile based on each third comfort preference aggregation;

generating an initial preference offset for the initial comfort preference aggregation based on each preference distance measure; and generating the unknown comfort model based on the initial comfort preference aggregation and the initial preference offset.

15. The apparatus of claim 12, wherein generating the unknown comfort model by performing the cross-space extrapolation comprises:

identifying a plurality of target occupant profiles for the known spatial element, wherein the plurality of target occupant profiles comprise the primary occupant profile and one or more shared occupant profiles, and wherein each shared occupant profile of the one or more shared occupant profiles for the known spatial element is associated with a first defined comfort model with respect to each known spatial element of the one or more known spatial elements and a second defined comfort model with respect to the unknown spatial element;

generating an unknown per-space comfort preference aggregation for each per-space occupant profile of the plurality of per-space occupant profiles with respect to the known spatial element;

for each known spatial element of the one or more known spatial elements:

generating a known per-space comfort preference aggregation for each shared occupant profile of the one or more shared occupant profiles with respect to the known spatial element, and generating a per-space comfort prediction for the known spatial element based on: (i) a first range of each known per-space comfort preference aggregation for a shared occupant profile of the one or more shared occupant profiles with respect to the known spatial element, (ii) a second range of each unknown per-space comfort preference aggregation for a target occupant profile of the plurality of target occupant profiles, and (iii) a primary known per-space comfort preference aggregation for the primary occupant profile with respect to the known spatial element; and generating the unknown comfort model based on each per-space comfort prediction for a known spatial element of the one or more known spatial elements.

16. The apparatus of claim 12, further comprising:

determining the comfort model for an occupant profile and a spatial element is outdated if a threshold amount of time has passed since the generation of the comfort model.

17. A non-transitory computer storage medium comprising instructions configured to cause one or more processors to at least perform a method, the method comprising:

obtaining a plurality of known comfort models, wherein the plurality of known comfort models comprise at least one of: (i) one or more cross-space comfort models each associated with a primary occupant profile and a known spatial element of one or more known spatial elements, (ii) one or more cross-profile comfort models each associated with a secondary occupant profile of one or more secondary occupant profiles and an unknown spatial element, and (iii) one or more cross-context comfort models each associated with a secondary occupant profile of the one or more secondary occupant profiles and a known spatial element of the one or more known spatial elements;

extrapolating the at least one of the plurality of known comfort models to generate the unknown comfort model for the primary occupant profile with respect to the unknown spatial element; and implementing a comfort model to control one or more spatial variables based on the unknown comfort model.

18. The non-transitory computer storage medium of claim 17, wherein performing extrapolation by implementing the cross profile model comprises:
- generating, a first comfort preference aggregation for the primary occupant profile with respect to the one or more known spatial elements;
- generating, for each secondary occupant profile of the one or more secondary occupant profiles, a second comfort preference aggregation associated with the one or more known spatial elements;
- generating, for each secondary occupant profile of the one or more secondary occupant profiles, a preference distance measure between the first comfort preference aggregation for the primary occupant profile and the second comfort preference aggregation for the secondary occupant profile;
- identifying, based on each preference distance measure for a secondary occupant profile of the one or more secondary occupant profiles, one or more proximate occupant profiles of the one or more secondary occupant profiles;
- generating, for each proximate occupant profile of the one or more proximate occupant profiles, a third comfort preference aggregation associated with the unknown spatial element based on the cross-context comfort model for the proximate occupant profile; and
- generating the unknown comfort model based on each third comfort preference aggregation for a proximate occupant profile of the one or more proximate occupant profiles.

19. The non-transitory computer storage medium of claim 17, wherein generating the unknown comfort model comprises:
- for each known spatial element of the one or more spatial elements, identifying a plurality of per-space occupant profiles, wherein the plurality of per-space occupant profiles for the known spatial element comprise the primary occupant profile and one or more shared occupant profiles for the known spatial element, and wherein each shared occupant profile of the one or more shared occupant profiles for the known spatial element is associated with a first defined comfort model with respect to the known spatial element and a second defined comfort model with respect to the unknown spatial element;
- determining whether the one or more known spatial elements comprise a first threshold number of spatial elements each having a second threshold number of shared occupant profiles; in response to determining that the one or more known spatial elements comprise the first threshold number of spatial elements, generating the unknown comfort model by performing a cross-space extrapolation based on the plurality of known comfort models; and
- in response to determining that the one or more known spatial elements fail to comprise the first threshold number of spatial elements, generating the unknown comfort model by performing a cross-profile extrapolation based on the plurality of known comfort models.

20. The non-transitory computer storage medium of claim 17, further comprising:
- obtaining a location assignment request for an event associated with the primary occupant profile; and
- processing the location assignment request based on the unknown comfort model to generate a location assignment for the event.

* * * * *